(12) United States Patent
Hayutin et al.

(10) Patent No.: US 7,900,089 B2
(45) Date of Patent: Mar. 1, 2011

(54) METHOD FOR CREATING ERROR TOLERANT AND ADAPTIVE GRAPHICAL USER INTERFACE TEST AUTOMATION

(75) Inventors: Wes D. Hayutin, Raleigh, NC (US); Howard S. Krovetz, Holly Springs, NC (US); Joshua D. Ghiloni, Durham, NC (US); Seth A. Schwartzman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/423,569

(22) Filed: Jun. 12, 2006

(65) Prior Publication Data
US 2008/0010537 A1 Jan. 10, 2008

(51) Int. Cl.
*G06F 11/00* (2006.01)
(52) U.S. Cl. ........................................................ 714/26
(58) Field of Classification Search .................. 714/26, 714/38, 46, 37; 717/127, 131
See application file for complete search history.

(56) References Cited

U.S. PATENT DOCUMENTS

| | | | | |
|---|---|---|---|---|
| 5,351,247 A | * | 9/1994 | Dow et al. ........................ | 714/26 |
| 5,410,648 A | | 4/1995 | Pazel .............................. | 395/158 |
| 5,600,789 A | * | 2/1997 | Parker et al. ..................... | 714/38 |
| 5,634,002 A | * | 5/1997 | Polk et al. ........................ | 714/38 |
| 5,740,408 A | | 4/1998 | Bonne et al. ..................... | 395/500 |
| 5,790,117 A | * | 8/1998 | Halviatti et al. .................. | 715/744 |
| 5,926,638 A | | 7/1999 | Inoue ............................... | 395/704 |
| 6,425,096 B1 | * | 7/2002 | Liese et al. ....................... | 714/43 |
| 6,438,713 B1 | | 8/2002 | Taira et al. ....................... | 714/38 |
| 6,725,449 B1 | | 4/2004 | Maeda et al. .................... | 717/124 |
| 6,766,475 B2 | | 7/2004 | Segal et al. ...................... | 714/38 |
| 6,785,884 B1 | | 8/2004 | Rieschl ........................... | 717/129 |
| 6,959,431 B1 | | 10/2005 | Shiels et al. ..................... | 717/124 |
| 2002/0133807 A1 | * | 9/2002 | Sluiman .......................... | 717/124 |
| 2003/0236775 A1 | * | 12/2003 | Patterson ......................... | 707/3 |
| 2004/0041827 A1 | * | 3/2004 | Bischof et al. .................. | 345/704 |
| 2004/0204894 A1 | * | 10/2004 | McGrath et al. ................ | 702/119 |
| 2006/0271830 A1 | * | 11/2006 | Kwong et al. ................... | 714/50 |

OTHER PUBLICATIONS

A. M. Memon et al., "Hierarchical GUI Test Case Generation Using Automated Planning," IEEE Transactions on Software Engineering, vol. 27, No. 2, Feb. 2001, pp. 144-155.

* cited by examiner

*Primary Examiner* — Scott T Baderman
*Assistant Examiner* — Yair Leibovich
(74) *Attorney, Agent, or Firm* — Hamilton & Terrile, LLP; Gary W. Hamilton

(57) ABSTRACT

A method, apparatus and computer-usable medium for the improved automated testing of a software application's graphical user interface (GUI) through implementation of a recording agent that allows the GUI interactions of one or more human software testers to be captured and incorporated into an error-tolerant and adaptive automated GUI test system. A recording agent is implemented to capture the GUI interactions of one or more human software testers. Testers enact a plurality of predetermined test cases or procedures, with known inputs compared against preconditions and expected outputs compared against the resulting postconditions, which are recorded and compiled into an aggregate test procedure. The resulting aggregate test procedure is amended and configured to correct and/or reconcile identified abnormalities to create a final test procedure that is implemented in an automated testing environment. The results of each test run are subsequently incorporated into the automated test procedure, making it more error-tolerant and adaptive as the number of test runs increases.

20 Claims, 13 Drawing Sheets

Analyzed And Modified Aggregate Test Run  444

Composite Test Run '1'  418
- [Close All Browsers]
- [Open New Browser]
- URL: "http://localhost: ..."
- [WPS Login:"wpsadmi..]
- 504 Add'l. Steps In Test Run 2
- Click on "PDM Portlet"
- Click "New"
- Click on "Rich Text Doc"
- Click on [Name] Field
- Type "New Rich Text ..."
- Click "OK"
- Click on [Search] Field
- Type "New Rich Text ..."
- Click "Search"
- Search for "New Rich ..."
- Click "Search"
- [Close Browser]
- 506 Add'l. Steps In Test Run 3

Composite Test Run '2'  426
- 502 Add'l. Steps In Test Run 1
- [Open New Browser]
- [URL: "http://localhost:..]
- [WPS Login:"wpsadmi..]
- Click "Administrator"
- Click "Pages"
- Click on [Search] Field
- Click on "PDM Portlet"
- Click "My Portal"
- Click "PDM Porlet"
- Click on "Rich Text Doc"
- Click on [Name] Field
- Type "New Rich Text ..."
- Click "OK"
- Click on [Search] Field
- Type "New Rich Text ..."
- Click "Search"
- 506 Add'l. Steps In Test Run 3

Composite Test Run '3'  434
- [Close All Browsers]
- [Open New Browser]
- [URL: "http://localhost:..]
- [WPS Login:"wpsadmi..]
- 504 Add'l. Steps In Test Run 2
- Click on "PDM Portlet"
- Click "New"
- Click on "Rich Text Doc"
- Click on [Name] Field
- Type "New Rich Text ..."
- Click "OK"
- Click on [Search] Field
- Type "New Rich Text ..."
- Click "OK"
- Click on [Search] Field
- Type "New Rich Text ..."
- Search for "New Rich ..."
- Click "Open"
- [Close Browser]

FIGURE 5

METHOD FOR CREATING ERROR TOLERANT AND ADAPTIVE GRAPHICAL USER INTERFACE TEST AUTOMATION

BACKGROUND OF THE INVENTION

The present invention relates in general to the field of computers and other data processing systems including hardware, software and processes. More specifically, it relates to error-tolerant and adaptive graphical user interface (GUI) test automation.

As software developers continue to introduce new and more sophisticated applications, there is a related increase in the complexity of the underlying program code. This complexity often extends to the application's graphical user interface (GUI), resulting in additional and sometimes unexpected challenges when developing meaningful software test procedures as part of a quality assurance (QA) process. Manual testing of an application's GUI can be labor intensive, error prone, and expensive, which has led the development of automated GUI testing solutions. While the goal of GUI test automation is to eliminate the need for manual testing, it is currently used as an adjunct to human testers.

Prior art approaches to automating GUI test procedures generally consist of either "record and playback" of manual GUI testing interactions or writing automated test procedures for each application. Record and playback approaches can be unreliable as it is likely that not all possible user gestures and GUI interactions will be captured and recorded for later playback. Developing custom-written automated GUI tests presents other challenges, as it often takes longer to develop the automated test than it does to test the GUI manually. Furthermore, GUI tests require debugging themselves and there is no guarantee that custom-written automated GUI tests will provide better coverage of all possible test cases. Similarly, the resulting test automation code can be susceptible to subsequent changes in the application being tested, which can contribute to unreliable testing and quality assurance results.

Other prior art approaches include the creation of test cases using a hierarchical model of a GUI's structure. Test cases generally serve as instructions or guides for human testers. Automated tests are intended to automatically navigate and test the functions of a software application without human assistance. There are also prior art approaches that automate the testing of GUI software by mapping the objects and buttons within a GUI window and then randomly clicking on buttons and entering text until the application fails. These approaches record the action that caused the application to fail, restart the application and then repeat the process, excluding any actions that previously caused the application to fail. However, these approaches are generally based on random actions and may not fully correlate to typical user behavior. In view of the foregoing, there is a need for improved test automation of a software application's GUI.

SUMMARY OF THE INVENTION

The present invention includes, but is not limited to, a method, apparatus and computer-usable medium for the improved automated testing of a graphical user interface (GUI) for a software application. In an embodiment of the present invention, a recording agent is implemented to capture the GUI interaction of one or more human software testers. The testers then enact a plurality of predetermined test cases or procedures with known inputs compared against preconditions and expected outputs compared against the resulting postconditions to test the anticipated operation of an application's GUI. The inputs, preconditions, interactions, outputs and postconditions of each testing session are recorded and compiled into a draft of an aggregate test procedure, which is then analyzed to identify the common failure points and anomalies for each test run.

The resulting aggregate test procedure draft is manually amended and configured to correct and/or reconcile identified abnormalities to create a final test procedure that is then implemented in an automated testing environment. It will be apparent to those of skill in the art that the resulting automated test procedure increases in reliability with the number of test runs that are performed. It will likewise be apparent that the present invention embodies the advantages of both "record and playback" and custom-written automated test procedures while simultaneously mitigating their respective disadvantages.

The various embodiments of the testing system of the present invention become progressively error-tolerant as the number and variety of human testers increases. In addition, the present invention does not require the development of custom test procedures nor does it rely on random manipulations of the GUI application. Instead, data from human users following test cases or procedures during test runs is gathered and correlated to generate an automated test procedure that can navigate and test a software application's GUI in an adaptive and error-tolerant manner. Furthermore, the resulting software GUI test runs are reliable, recordable and auditable, thereby providing verifiable documentation that is often required for compliance certification. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 5 is a generalized depiction of a modified aggregate test procedure as implemented in accordance with an embodiment of the invention;

DETAILED DESCRIPTION

Figure 3:
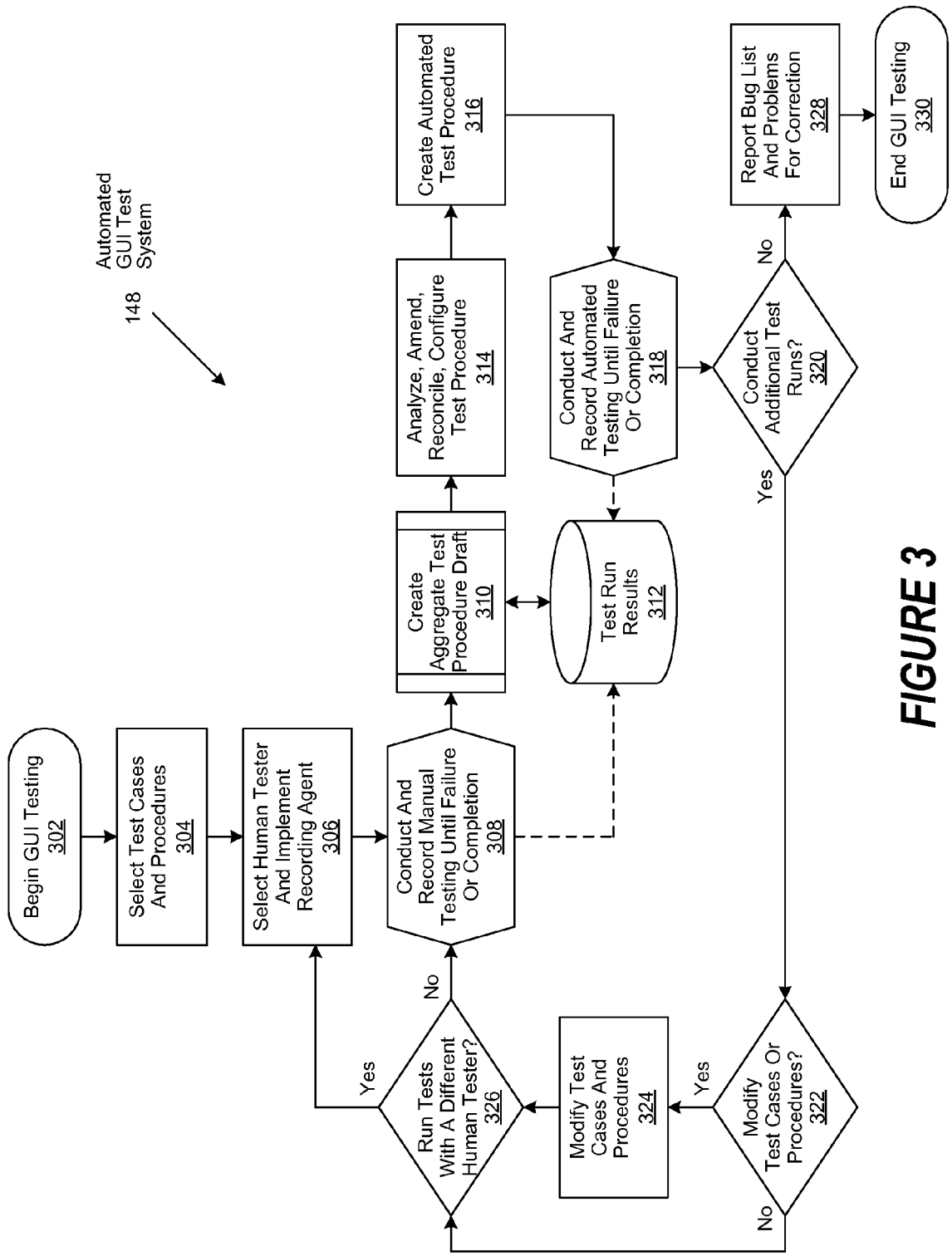
FIG. 3 is a generalized flow chart of an error-tolerant and adaptive automated graphical user interface (GUI) test system as implemented in accordance with an embodiment of the invention.

With reference now to the figures, and in particular to FIG. 3, there is depicted a method, apparatus and computer-usable medium for the improved automated testing of a software application's graphical user interface (GUI) through implementation of a recording agent that allows the GUI interaction of one or more human software testers to be captured and incorporated into an automated GUI test system.

Figure 1:
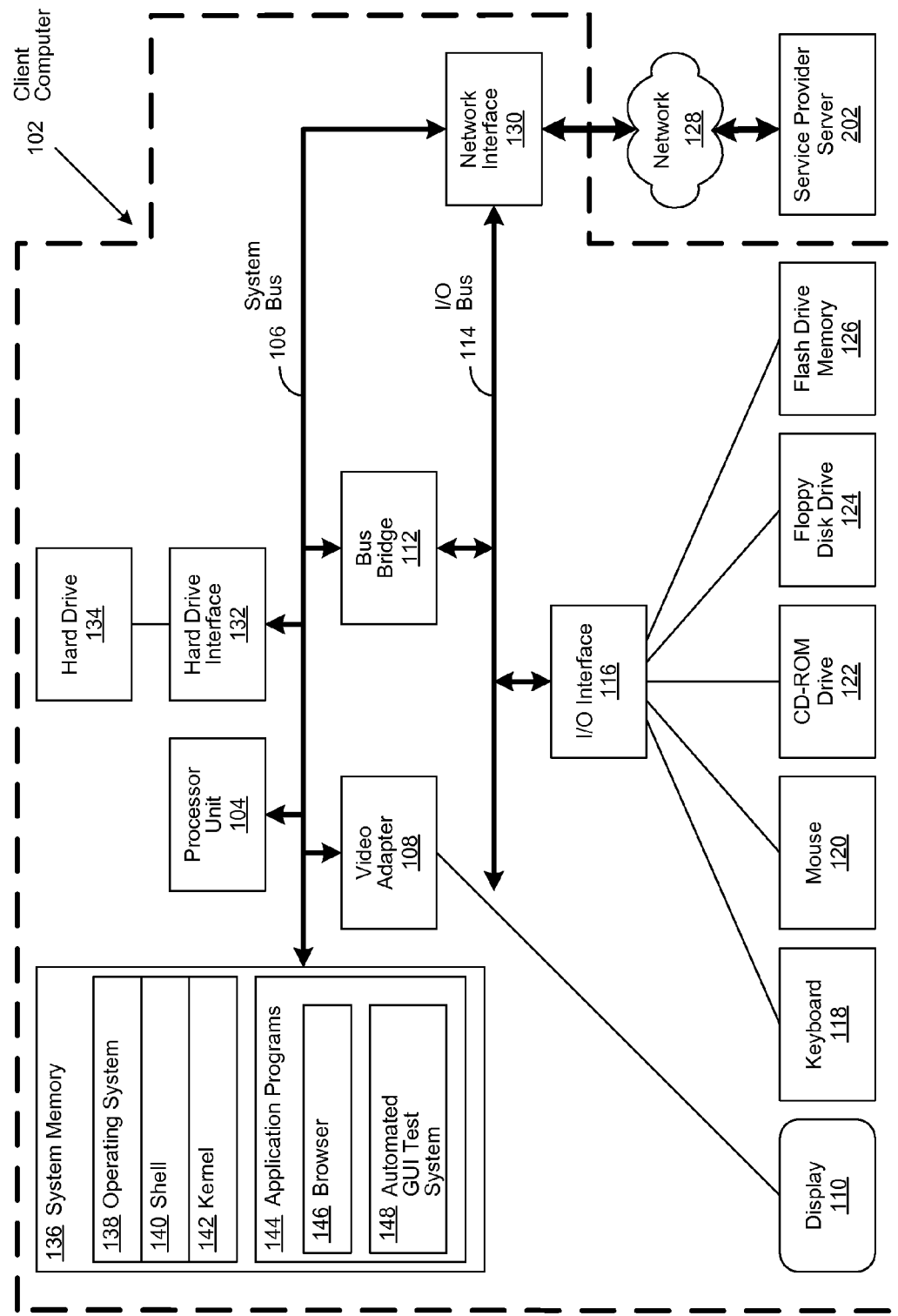
FIG. 1 depicts an exemplary client computer in which the present invention may be implemented.

With reference now to FIG. 1, there is depicted a block diagram of an exemplary client computer 102, in which the present invention may be utilized. Client computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 416 may be any known to those skilled in the art of computer architecture, including but not limited to Universal Serial Bus (USB) ports.

Client computer 102 is able to communicate with a service provider server 202 via a network 128 using a network interface 130, which is coupled to system bus 106. Network 128 may be an external network such as the Internet, or an internal network such as an Ethernet or a Virtual Private Network (VPN). Using network 128, client computer 102 is able to use the present invention to access service provider server 202.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 202.

Application programs 144 in client computer 102's system memory also include an automated graphical user interface (GUI) test system 148. Automated GUI test system 148 includes code for implementing the processes described in FIG. 3. In one embodiment, client computer 102 is able to download automated GUI test system 148 from service provider server 202.

The hardware elements depicted in client computer 102 are not intended to be exhaustive, but rather are representative to highlight essential components required by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
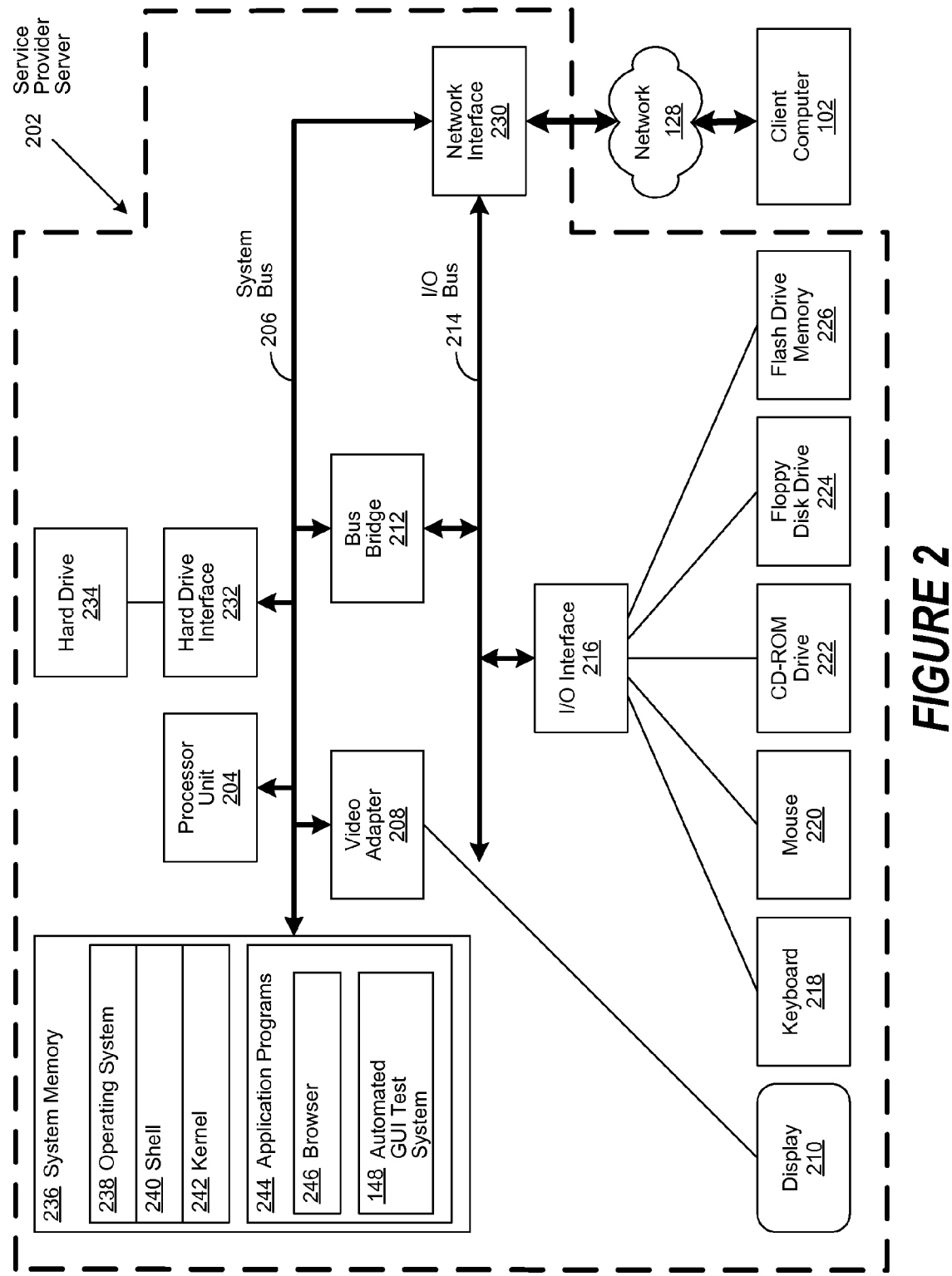
FIG. 2 illustrates an exemplary server from which software for executing the present invention may be deployed and/or implemented for the benefit of a user of the client computer shown in FIG. 4.

As noted above, automated GUI test system 148 can be downloaded to client computer 202 from service provider server 202, shown in exemplary form in FIG. 2. Service provider server 202 includes a processor unit 204 that is coupled to a system bus 206. A video adapter 208 is also coupled to system bus 206. Video adapter 208 drives/supports a display 210. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Service provider server 202 is able to communicate with client computer 102 via network 128 using a network interface 230, which is coupled to system bus 206. Access to network 128 allows service provider server 202 to execute and/or download automated GUI test system 148 to client computer 102.

System bus 206 is also coupled to a hard drive interface 232, which interfaces with a hard drive 234. In a preferred embodiment, hard drive 234 populates a system memory 236, which is also coupled to system bus 206. Data that populates system memory 236 includes service provider server 202's operating system 238, which includes a shell 240 and a kernel 242. Shell 240 is incorporated in a higher level operating system layer and utilized for providing transparent user access to resources such as application programs 244, which include a browser 246, and a copy of automated GUI test system 148 described above, which can be deployed to client computer 102.

The hardware elements depicted in service provider server 202 are not intended to be exhaustive, but rather are representative to highlight essential components required by the present invention. For instance, service provider server 202 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 202 performs all of the functions associated with the present invention (including execution of automated GUI test system 148), thus freeing client computer 102 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and system memory such as but not limited to Random Access Memory (RAM). Further, it is understood that the present invention may be implemented by a system having means in the form of hardware, software, or a combination of software and hardware as described herein or their equivalent.

FIG. 3 is a generalized flow chart of an error-tolerant and adaptive automated graphical user interface (GUI) test system 148 as implemented in accordance with an embodiment of the invention. In Step 302, testing of a software application's GUI begins. In Step 304, predetermined test cases and procedures to be implemented by human testers during testing are selected. In Step 306, a human tester is selected to conduct testing, and a recording agent is implemented on their computer.

A test run is conducted in Step 308 by the tester enacting the predetermined test cases or procedures, during which, known inputs are compared against preconditions and expected outputs are compared against the resulting postconditions to test the anticipated operation of a subject application's GUI. Once testing of the GUI has failed or completed in Step 308, the recorded inputs, preconditions, interactions, outputs and postconditions of the test run are added to the results of prior test runs in Step 312, with the resulting compilation of test run results then used to create a draft of an aggregate test procedure draft in Step 310. The aggregate test procedure draft is then analyzed to identify failure points common to two or more test runs as well as the operating anomalies and disparities of individual test runs, which are then manually amended, reconciled and/or configured in Step 314.

For example, in an embodiment of the invention, individual test runs are deconstructed to various levels of granularity (e.g., a step within a test, a task within a step, a command within a task, etc.) and then compared for common actions, differences, unexpected actions or anomalies that occurred during the test run. In another embodiment of the invention, a draft set of actions is produced using a rules-based decision engine, with rule considerations including, but not limited to, the respective characteristics of human testers (e.g., novice, expert, etc.), and the frequency and commonality of tasks in the test runs. In yet another embodiment of the invention, results of the analysis that do not share commonalities are displayed in a "diff" utility so testing administrators can manually choose the appropriate actions (e.g., add, remove, modify, configure, etc.) for individual elements of the aggregate test procedure draft. Likewise, while commonalities between test run results may normally be trusted as reliable and not require the administrator's attention, the ability to make modifications to the aggregate test procedure draft is retained. Alternative testing paths and individual tester's reactions to abnormalities in different test runs can similarly be examined, edited and/or incorporated for use as alternative testing actions.

An automated test procedure is then created in Step 316 from the amended, reconciled and configured test procedure draft created in Step 314 for implementation in an automated testing environment. In Step 318, automated playback of the automated test procedure created in Step 316 enacts the same predetermined test cases or procedures manually enacted in Step 308, during which known inputs are compared against preconditions and expected outputs are compared against the resulting postconditions to test the anticipated operation of the subject application's GUI. Once testing of the GUI has failed or completed in Step 318, the recorded inputs, preconditions, interactions, outputs and postconditions of the test run are then added to the results of prior test runs in Step 312.

If it is decided in Step 320 to conduct additional test runs, it is then decided in Step 322 whether to modify the current test cases and/or procedures. If it is decided in Step 322 to modify the current test cases and/or procedures, they are modified in Step 324 and it is then decided in Step 326 whether to run tests with a different human tester. If it is decided in Step 326 to run tests with a different human tester, then a human tester is selected in Step 306 and the test run is continued as described in greater detail hereinabove. Otherwise, the current human tester then enacts predetermined test cases or procedures in Step 308 and continues the test run as described in greater detail hereinabove. If it is decided in Step 322 to continue using the current test cases and/or procedures, it is then decided in Step 326 whether to run tests with a different human tester. If it is decided in Step 326 to run tests with a different human tester, then a human tester is selected in Step 306 and the test run is continued as described in greater detail hereinabove. Otherwise, the current human tester then enacts predetermined test cases or procedures in Step 308 and the test run is continued as described in greater detail hereinabove.

If it is decided in Step 320 to not conduct additional test runs, then a software bug list and other problems are reported in Step 328 and GUI testing is ended in Step 330. It will be apparent to those of skill in the art that different embodiments of the invention become progressively error-tolerant and adaptive as the number and variety of human testers increases. Furthermore, the invention does not require the development of custom test procedures nor does it rely on random manipulations of the GUI application. Instead, data from human users following test cases or procedures during test runs is gathered and correlated to generate an automated test procedure that can navigate and test a software application's GUI in an error-tolerant and adaptive manner. In addition, the resulting software GUI test runs are reliable, recordable and auditable, thereby providing verifiable documentation that is often required for compliance certification.

Figure 4:
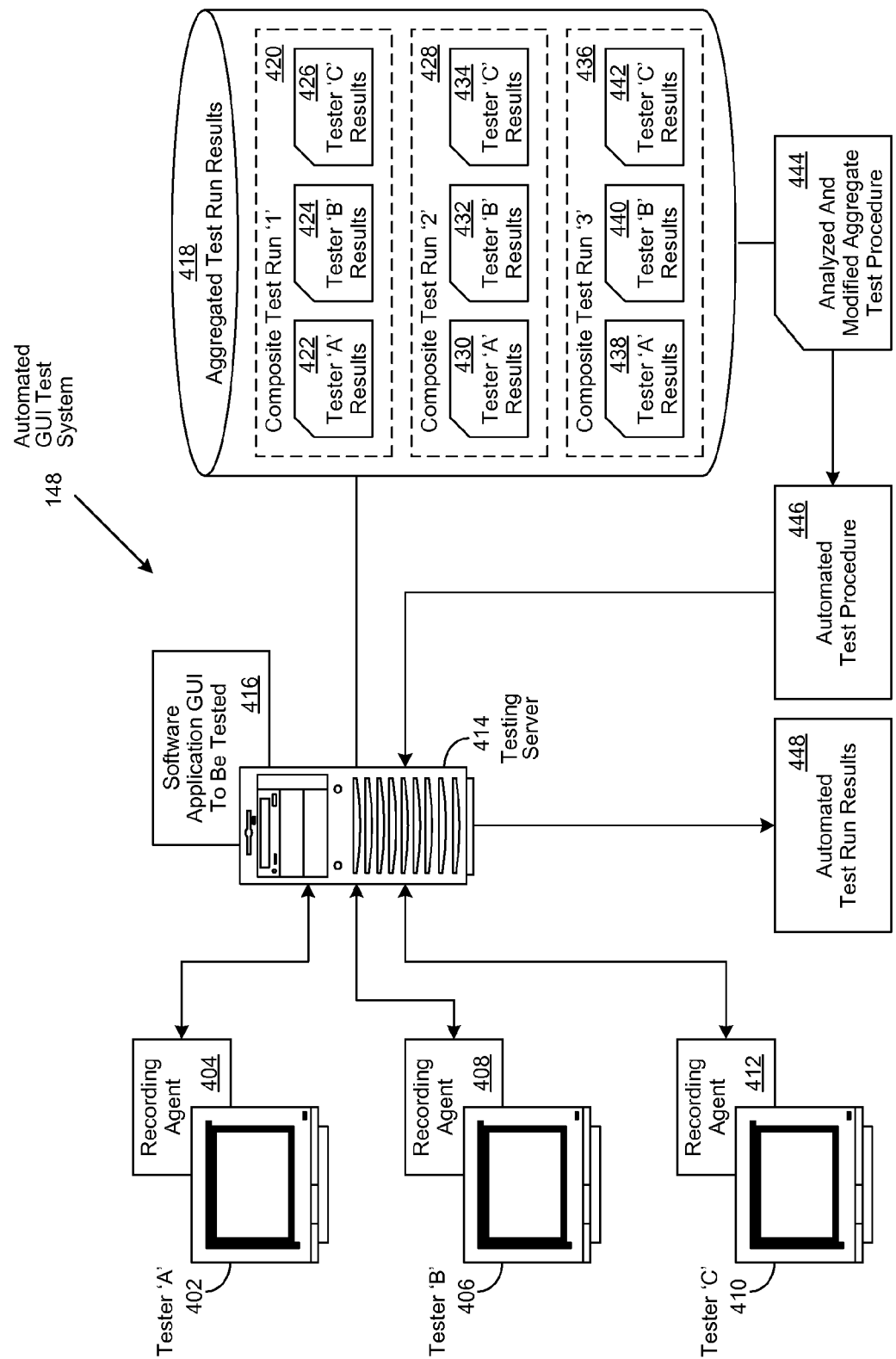
FIG. 4 is a generalized block diagram of an error-tolerant and adaptive automated GUI test system as implemented in accordance with an embodiment of the invention.

FIG. 4 is a generalized block diagram of an error-tolerant and adaptive automated GUI test system 148 as implemented in accordance with an embodiment of the invention. Error-tolerant and adaptive automated GUI test system 148 comprises testing computers for human tester 'A' 402, 'B' 406, and 'C' 410, testing server 414, aggregated test run results 418, analyzed and modified aggregate test procedure 444, automated test procedure 446, and automated test run results 448. Testing server 414 comprises subject software application GUI to be tested 416, and aggregated test run results 418 comprises composite test run '1' results 420, composite test run '2' results 428, and composite test run '3' results 436. Composite test run '1' results 420 comprises test run '1' results from tester 'A' 422, test run '1' results from tester 'B' 424, and test run '1' results from tester 'C' 426. Composite test run '2' results 428 comprises test run '2' results from tester 'A' 430, test run '2' results from tester 'B' 432, and test run '2' results from tester 'C' 434. Composite test run '3' results 436 comprises test run '3' results from tester 'A' 438, test run '3' results from tester 'B' 440, and test run '3' results from tester 'C' 442.

In different embodiments of the invention, recording agents 404, 408, 412, are respectively implemented on testing computers for human tester 'A' 402, 'B' 406, and 'C' 410, and testing of software application's GUI 416, comprising testing server 414, is initiated. Predetermined test cases and procedures are selected and enacted by human testers 'A' 402, 'B' 406, 'C' 410, during which known inputs are compared against preconditions and expected outputs are compared against the resulting postconditions to test the anticipated operation of a subject software application's GUI 416 comprising testing server 414 during a test run. Once each tester's testing of the software application's GUI 416 has failed or completed in a test run, inputs, preconditions, interactions, outputs and postconditions of the respective test run captured by recording agents 404, 408, 412 are added to the results of prior test runs comprising aggregated test run results 418.

Aggregated test run results 418 are analyzed to identify failure points common to two or more test runs as well as the operating anomalies and disparities of individual test runs, which are then manually amended, reconciled and/or configured as described in greater detail hereinabove to create analyzed and modified aggregate test procedure 444. Automated test procedure 446 is created from analyzed and modified aggregate test procedure 444 and implemented on testing server 414 for automated testing of subject software application's GUI 416 resulting in automated test run results 448.

In an embodiment of the invention, respective results from a first test run for tester 'A' 422, tester 'B' 424, and tester 'C' 426 are combined into composite test run '1' 420, which is then analyzed to identify failure points common to each tester's individual test results, as well as their individual operating anomalies and disparities, which are then manually amended, reconciled and/or configured as described in greater detail hereinabove to create analyzed and modified aggregate test procedure 444. Automated test procedure 446 is created from analyzed and modified aggregate test procedure 444 and implemented on testing server 414 for automated testing of subject software application's GUI 416 resulting in automated test run results 448, which are used as input to make changes to subject software application's GUI 416.

A second test run is made with the respective results for tester 'A' 430, tester 'B' 432, and tester 'C' 434 combined into composite test run '2' 428, which is then analyzed and/or modified as described in greater detail hereinabove to create analyzed and modified aggregate test procedure 444. A second error-tolerant, adaptive automated test procedure 446 is created and implemented for automated testing of subject software application's GUI 416 resulting in automated test run results 448, which are used as input to make subsequent changes to subject software application's GUI 416.

A third test run is then made with the respective results for tester 'A' 438, tester 'B' 440, and tester 'C' 442 combined into composite test run '2' 436, which is then analyzed and/or modified as described in greater detail hereinabove to create analyzed and modified aggregate test procedure 444. A third automated test procedure 446 is created and implemented for automated testing of subject software application's GUI 416 resulting in automated test run results 448. It will be apparent to those of skill in the art that each successive test run implementing automated test procedure 446 becomes progressively more error-tolerant an adaptive by incorporating the results from prior test runs.

FIG. 5 is a generalized depiction of modified aggregate test procedure 444 as implemented in accordance with an embodiment of the invention. Modified aggregate test procedure 444 comprises composite test run '1' results 420, composite test run '2' results 428, and composite test run '3' results 436. Composite test run '1' results 420 comprises test steps comprising test run '1', additional test steps from test run '2' 504, and additional test steps from test run '3' 506. Composite test run '2' results 428 comprises test steps comprising test run '2', additional test steps from test run '1' 502, and additional test steps from test run '3' 506. Composite test run '3' results 436 comprises test steps comprising test run '3' and additional test steps from test run '2' 504.

As described in greater detail hereinabove, analyzed and modified aggregate test procedure 444 is a result of identifying failure points common to two or more test runs as well as the operating anomalies and disparities of individual test runs, which are then manually amended, reconciled and/or configured, which in turn is used to create error-tolerant, adaptive automated test procedure 446, which is implemented on testing server 414 for automated testing of subject software application's GUI 416 resulting in automated test run results 448.

Thus, the method described herein, and in particular as shown and described in FIG. 3, can be deployed as a process software from service provider server 202 to client computer 102.

Figure 6A:
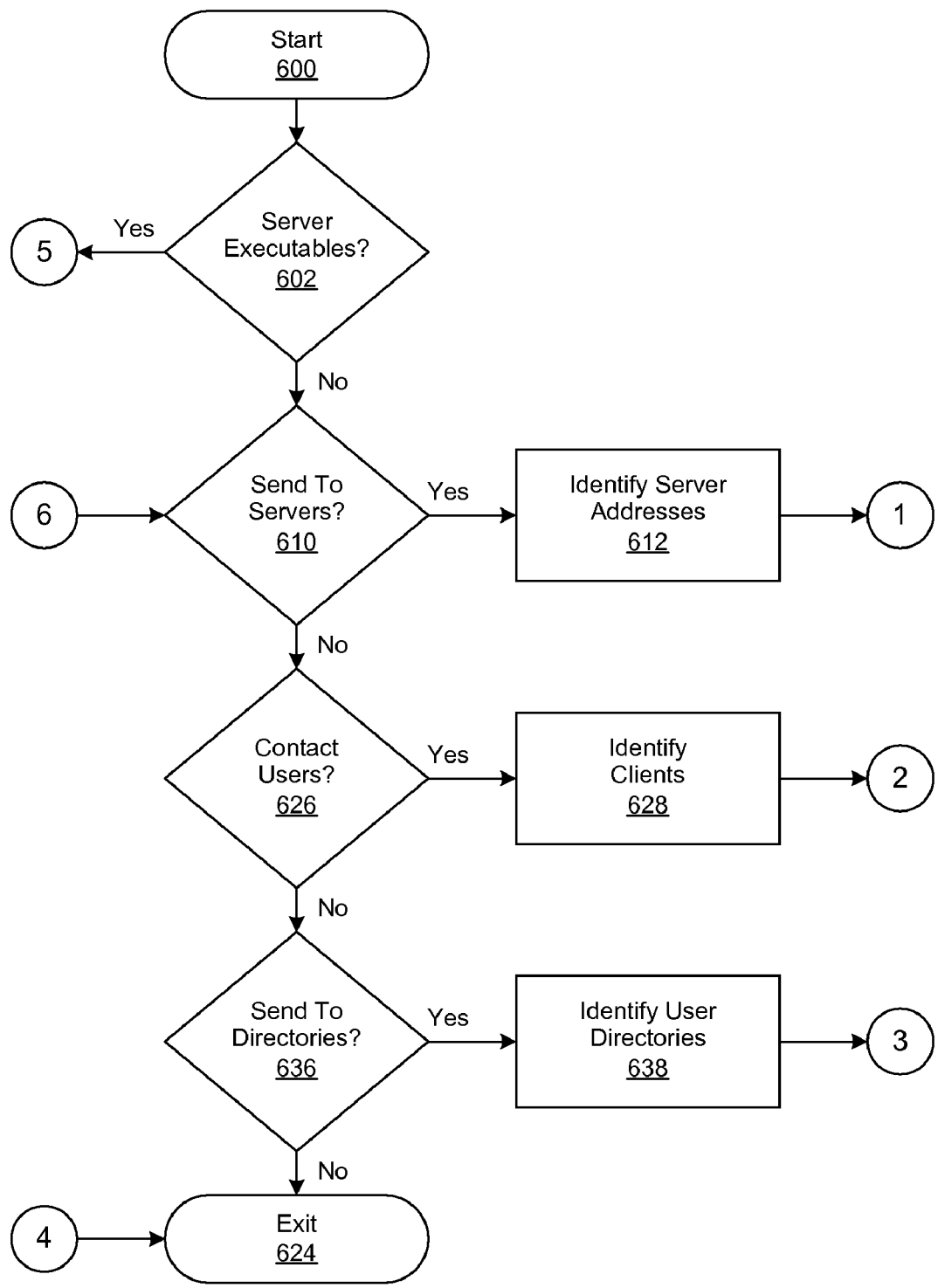
FIGS. 6a-b show a flow-chart of steps taken to deploy software capable of executing the steps shown and described in FIG. 3.
Figure 6B:
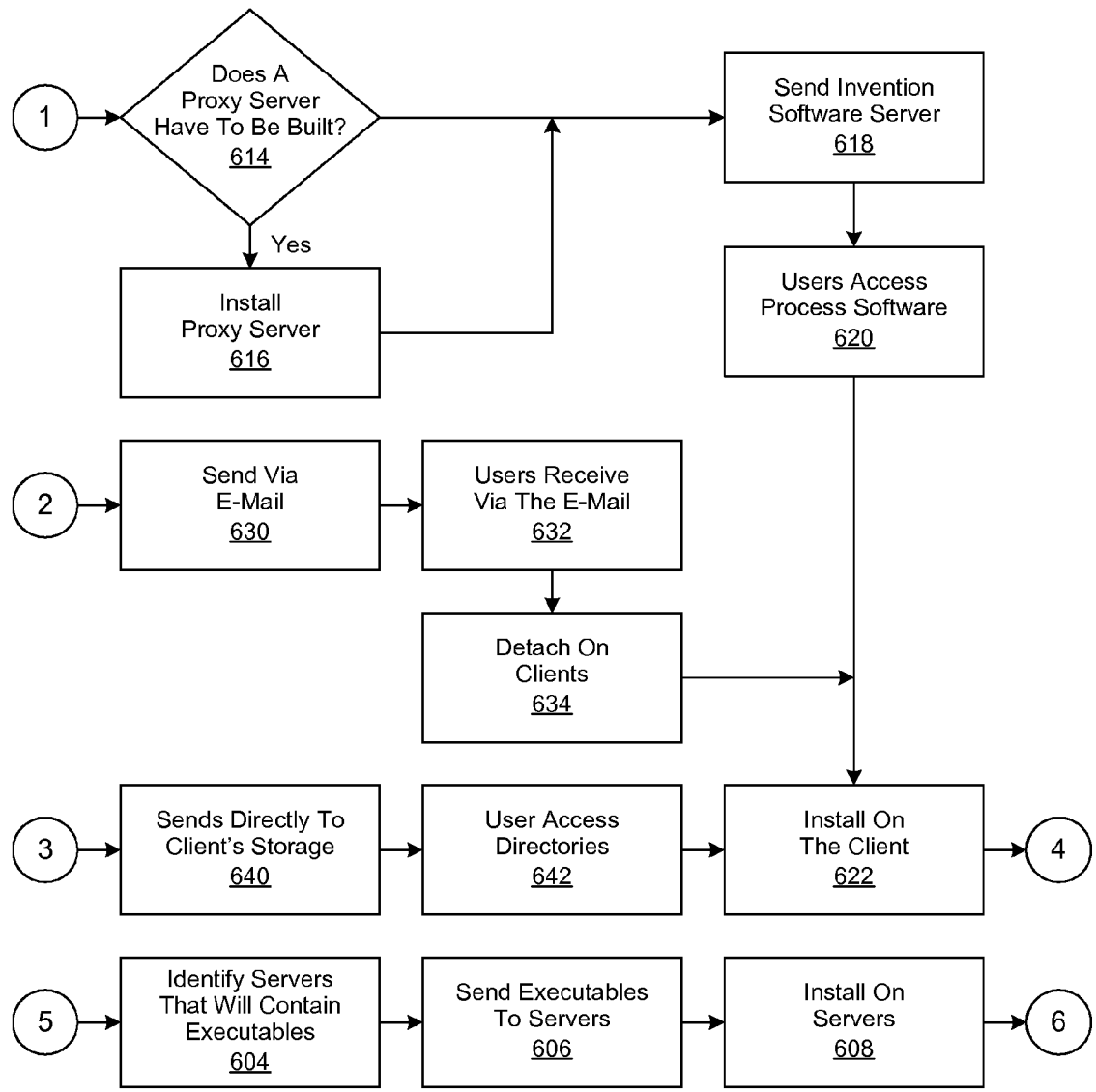

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7A:
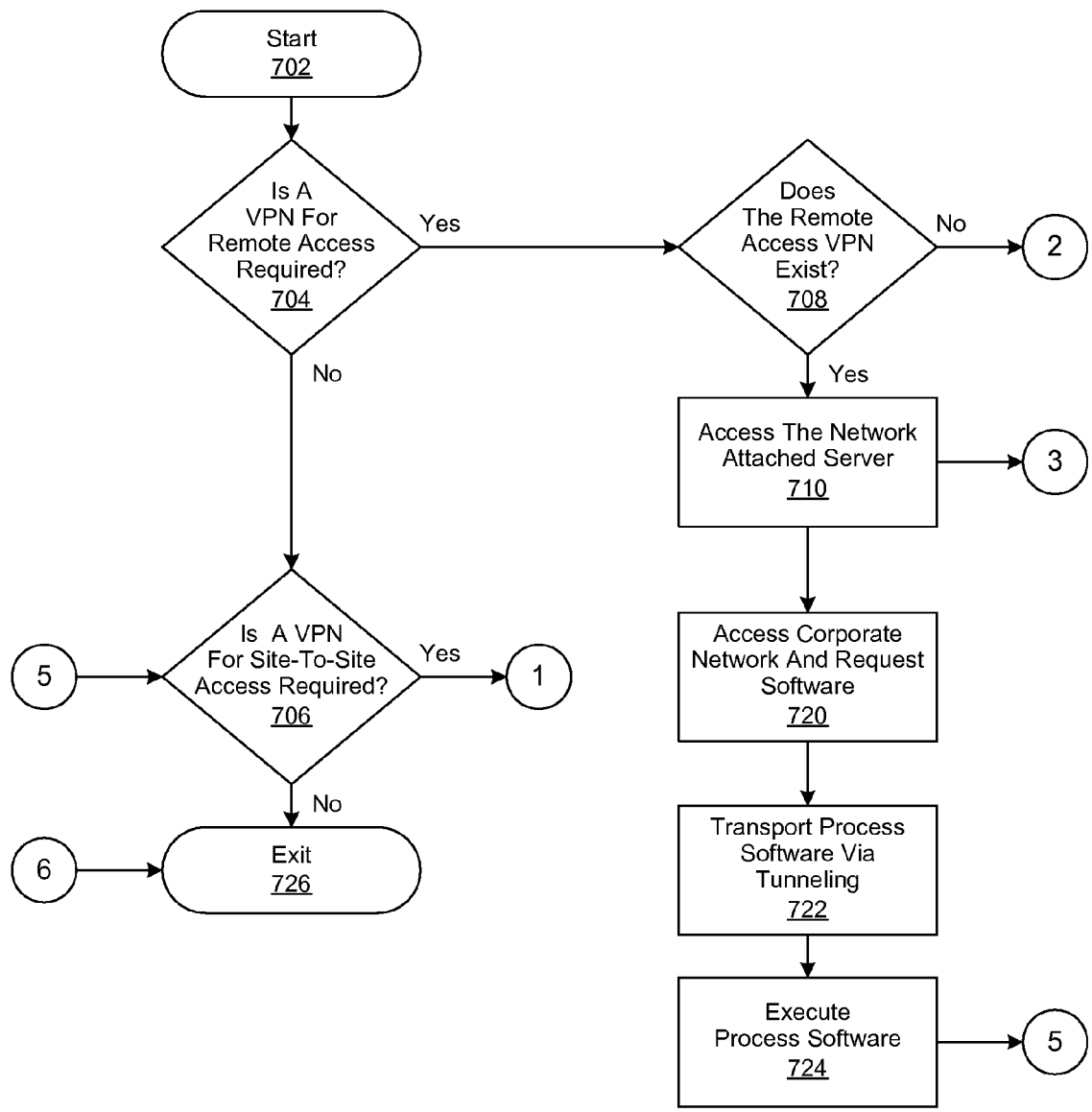
FIGS. 7a-c show a flow-chart of steps taken to deploy in a Virtual Private Network (VPN) software that is capable of executing the steps shown and described in FIG. 3.
Figures 7B, 7C:
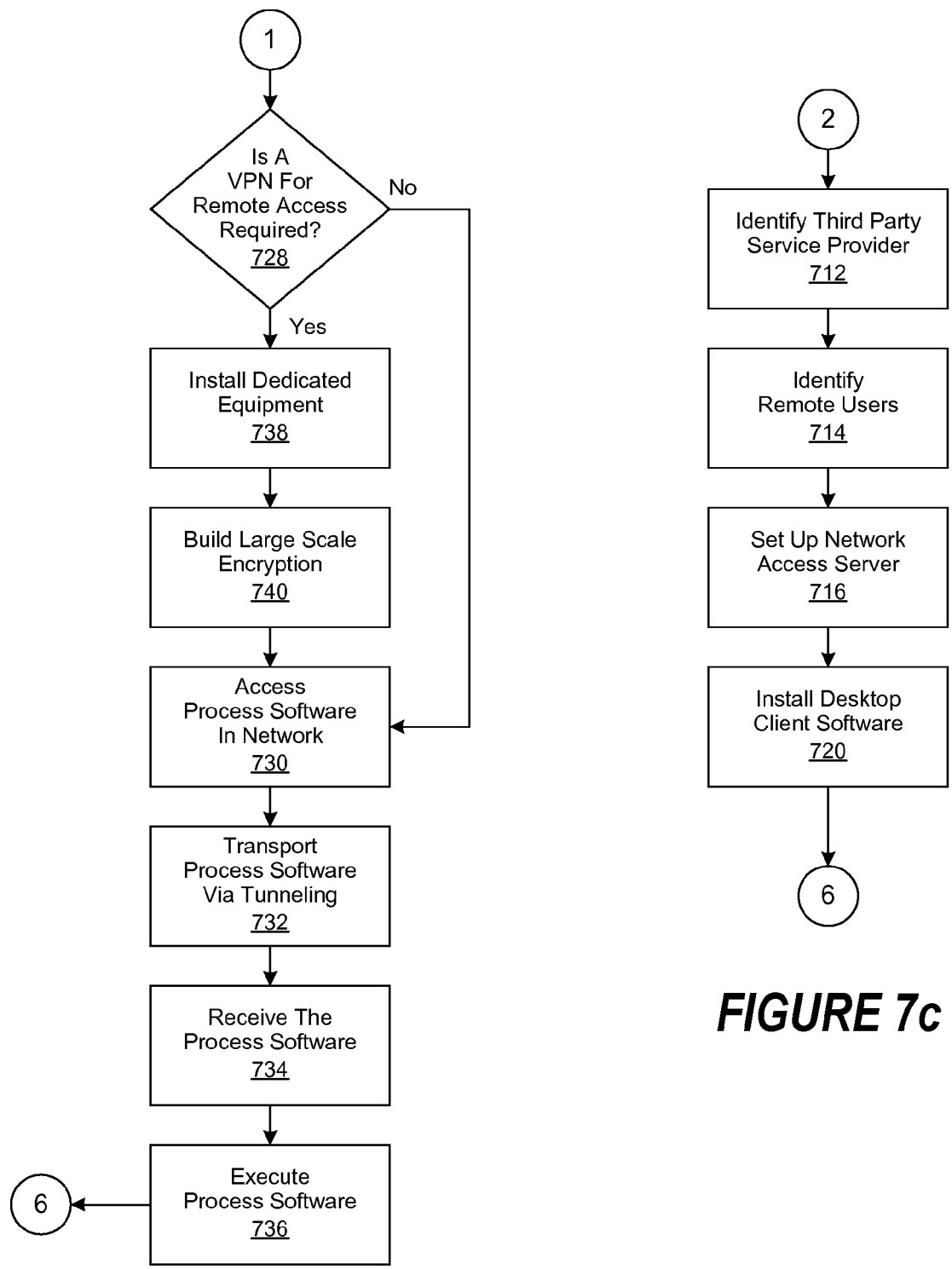

The process for such VPN deployment is described in FIG. 7. Initiator block 702 begins the Virtual Private Network (VPN) process. A determination is made to see if a VPN for remote access is required (query block 704). If it is not required, then proceed to query block 706. If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is, the process software is divided into packets and each packet including the data and protocol is placed within another packet (block 722). When the process software arrives at the remote user's desktop, it is removed from the packets, reconstituted and then is executed on the remote user's desktop (block 724).

A determination is then made to see if a VPN for site to site access is required (query block 706). If it is not required, then proceed to exit the process (terminator block 726). Otherwise, determine if the site to site VPN exists (query block 728). If it does not exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site user's desktop (block 736). The process then ends at terminator block 726.

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
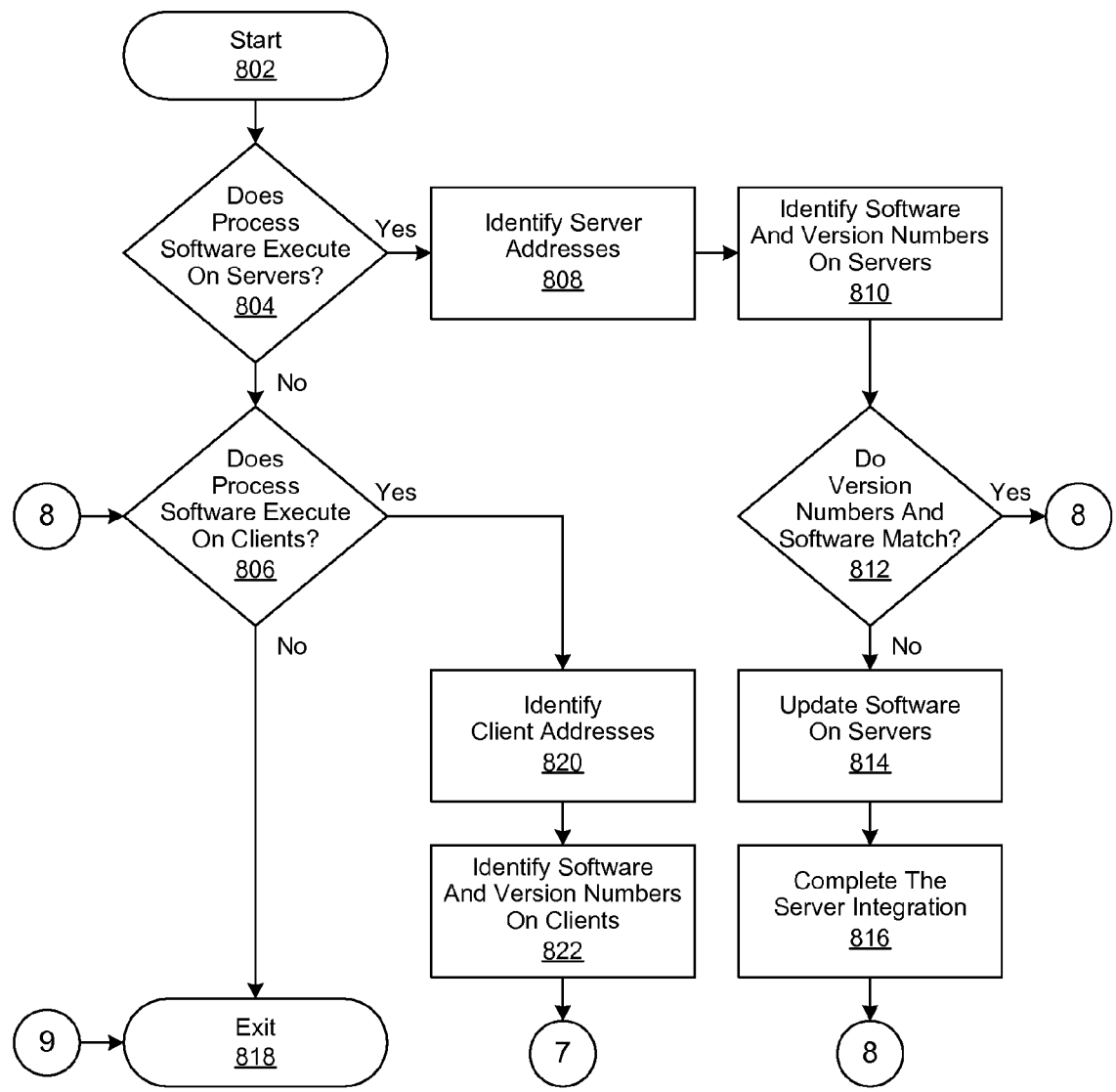
FIGS. 8a-b show a flow-chart showing steps taken to integrate into a computer system software that is capable of executing the steps shown and described in FIG. 3.
Figure 8B:
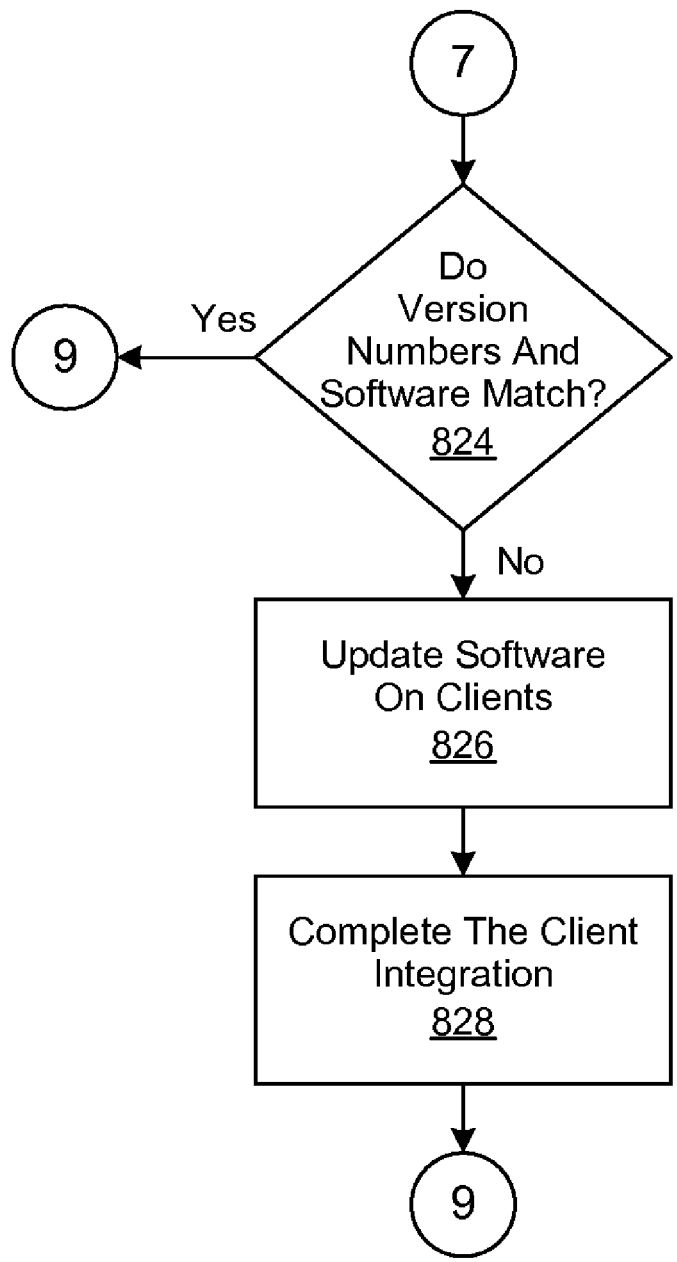

For a high-level description of this process, reference is now made to FIG. 8. Initiator block 802 begins the integration of the process software. The first tiling is to determine if there are any process software programs that will execute on a server or servers (block 8). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments.

Figure 9A:
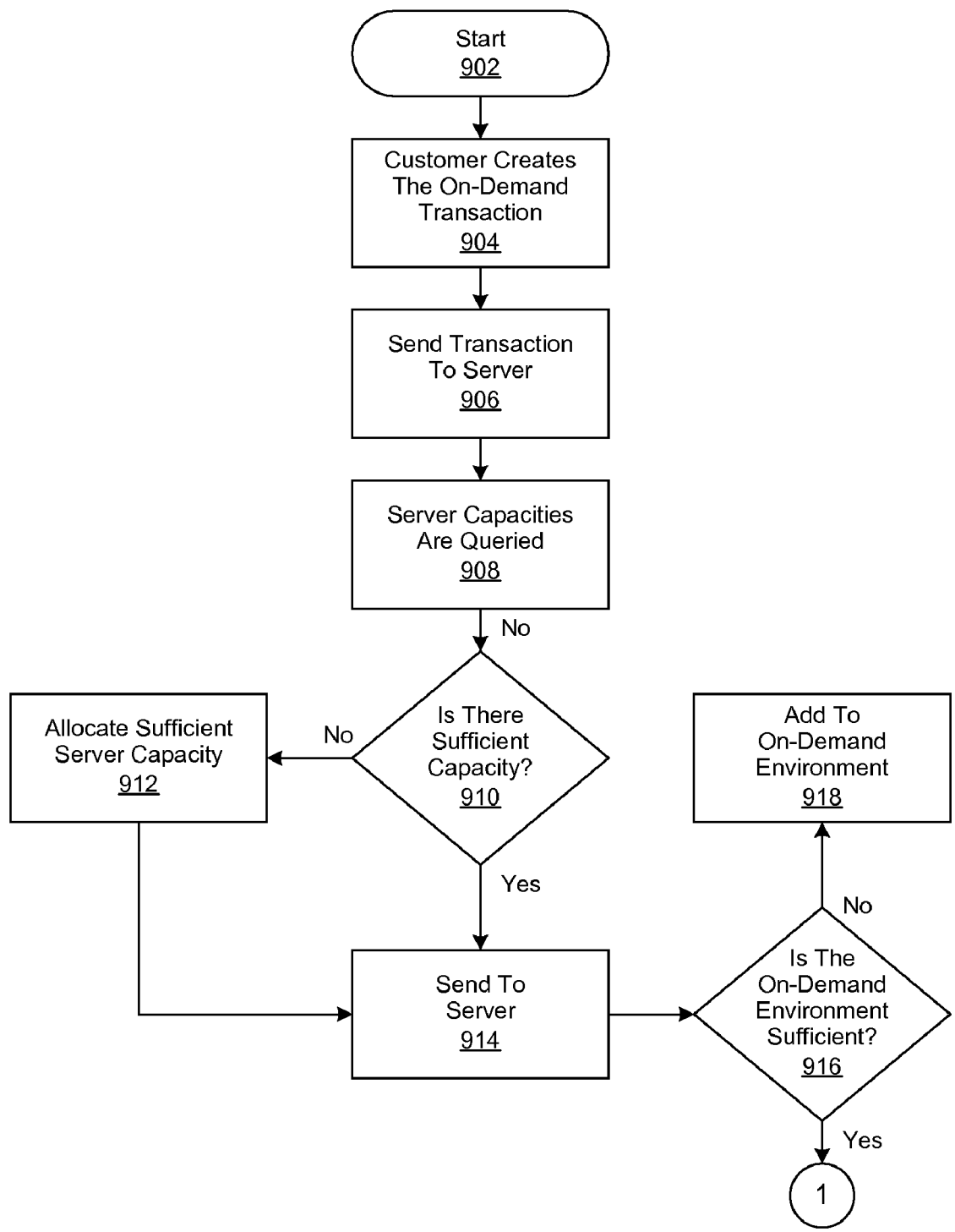
FIGS. 9*a-b* show a flow-chart showing steps taken to execute the steps shown and described in FIG. 3 using an on-demand service provider.
Figure 9B:
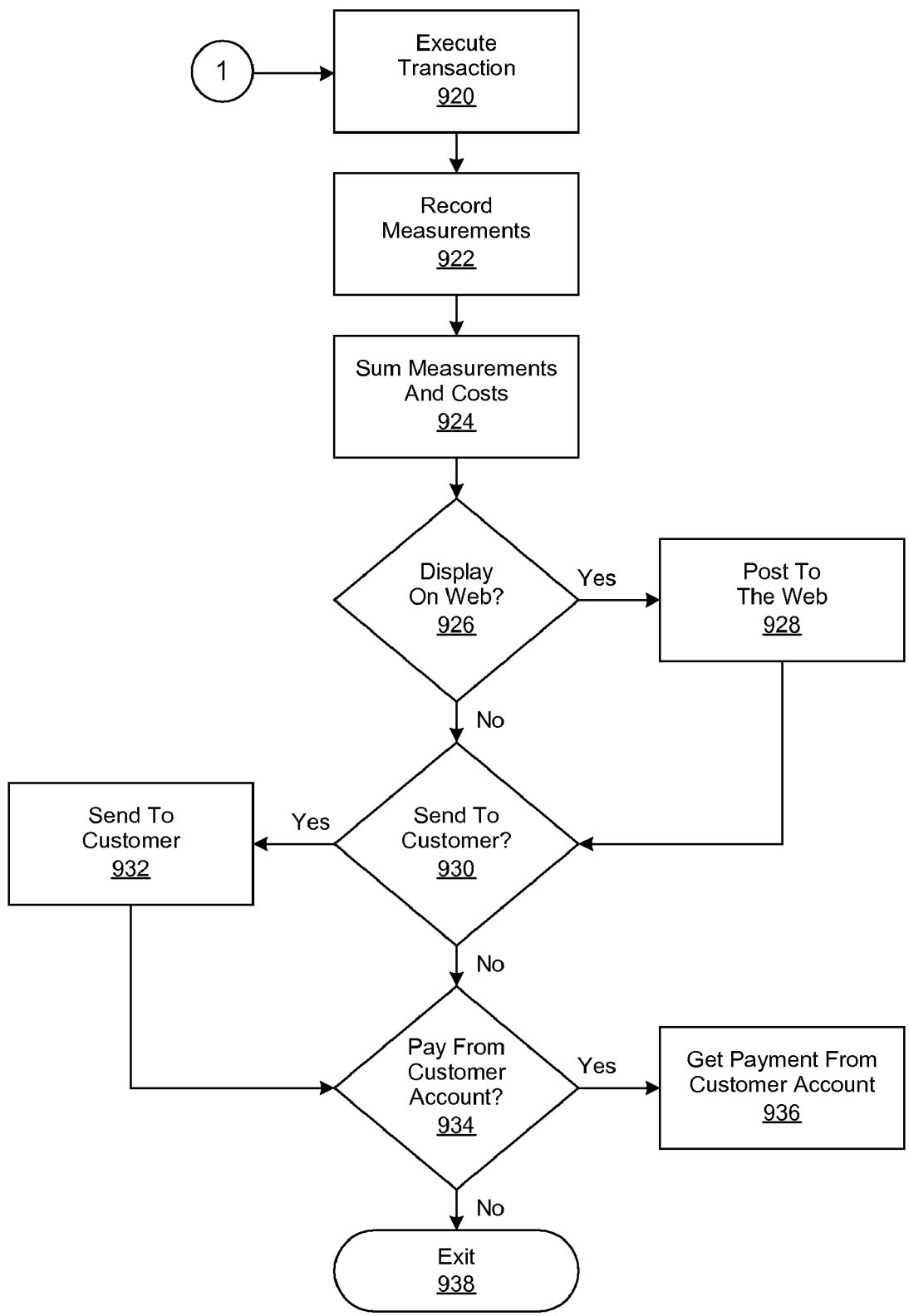

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method for testing a graphical user interface, comprising processing logic used for:
    capturing a first set of user interaction data corresponding to a first plurality of user interactions with a graphical user interface during a first test procedure;
    processing said first set of user interaction data to generate composite test data corresponding to said user interactions during said first test procedure;
    processing said composite test data to generate a second test procedure therefrom;
    capturing a second set of user interaction data corresponding to a second plurality of user interactions with said graphical user interface during said second test procedure;
    processing said second set of user interaction data to generate adaptive processes for further testing of said graphical user interface;
    wherein said processing of said first and second sets of user interaction data does not cause said first and second test procedures to become inoperable and said adaptive processes comprise a subsequent test procedure for said graphical user interface.

2. The method of claim 1, further comprising:
    using a recording agent to capture said first and second sets of user interaction data.

3. The method of claim 2, wherein said first test procedure comprises a first set of known inputs compared against a first set of preconditions and a corresponding first set of expected outputs compared against a first set of postconditions.

4. The method of claim 3, wherein said first set of known inputs, preconditions, outputs and postconditions of said first test procedure are recorded by said recording agent and analyzed to generate said second test procedure.

5. The method of claim 4, wherein said second test procedure comprises a second set of known inputs compared against a second set of preconditions and a corresponding second set of expected outputs compared against a second set of postconditions.

6. The method of claim 5, further comprising:
    executing said second test procedure;
    using said recording agent to capture data corresponding to said second set of known inputs, preconditions, outputs and post conditions; and
    using said captured data from said second test procedure to generate said adaptive processes.

7. A system comprising:
    a processor;
    a data bus coupled to the processor; and
    a computer-usable medium embodying computer program code, the computer-usable medium being coupled to the data bus, the computer program code comprising instructions executable by the processor and configured for:
        capturing a first set of user interaction data corresponding to a first plurality of user interactions with a graphical user interface during a first test procedure;
        processing said first set of user interaction data to generate composite test data corresponding to said user interactions during said first test procedure;
        processing said composite test data to generate a second test procedure therefrom;
        capturing a second set of user interaction data corresponding to a second plurality of user interactions with said graphical user interface during said second test procedure;
        processing said second set of user interaction data to generate adaptive processes for further testing of said graphical user interface,
        wherein said processing of said first and second sets of user interaction data does not cause said first and second test procedures to become inoperable and said adaptive processes comprise a subsequent test procedure for said graphical user interface.

8. The system of claim 7, wherein the instructions are further configured for:
    using a recording agent to capture said first and second sets of user interaction data.

9. The system of claim 8, wherein said first test procedure comprises a first set of known inputs compared against a first set of preconditions and a corresponding first set of expected outputs compared against a first set of postconditions.

10. The system of claim 9, wherein said first set of known inputs, preconditions, outputs and postconditions of said first test procedure are recorded by said recording agent and analyzed to generate said second test procedure.

11. The system of claim 10, wherein said second test procedure comprises a second set of known inputs compared against a second set of preconditions and a corresponding second set of expected outputs compared against a second set of postconditions.

12. The system of claim 11, wherein the instructions are further configured for:
  executing said second test procedure;
  using said recording agent to capture data corresponding to said second set of known inputs, preconditions, outputs and post conditions; and
  using said captured data from said second test procedure to generate said adaptive processes.

13. A computer-usable medium embodying computer program code, the computer program code comprising computer executable instructions configured for:
  capturing a first set of user interaction data corresponding to a first plurality of user interactions with a graphical user interface during a first test procedure;
  processing said first set of user interaction data to generate composite test data corresponding to said user interactions during said first test procedure;
  processing said composite test data to generate a second test procedure therefrom;
  capturing a second set of user interaction data corresponding to a second plurality of user interactions with said graphical user interface during said second test procedure;
  processing said second set of user interaction data to generate adaptive processes for further testing of said graphical user interface;
  wherein said processing of said first and second sets of user interaction data does not cause said first and second test procedures to become inoperable and said adaptive processes comprise a subsequent test procedure for said graphical user interface.

14. The computer-usable medium of claim 13, wherein the embodied computer program code further comprises computer executable instructions configured for:
  using a recording agent to capture said first and second sets of user interaction data.

15. The computer-useable medium of claim 14, wherein said first test procedure comprises a first set of known inputs compared against a first set of preconditions and a corresponding first set of expected outputs compared against a first set of postconditions.

16. The computer-usable medium of claim 15, wherein said first set of known inputs, preconditions, outputs and postconditions of said first test procedure are recorded by said recording agent and analyzed to generate said second test procedure.

17. The computer-usable medium of claim 16, wherein said second test procedure comprises a second set of known inputs compared against a second set of preconditions and a corresponding second set of expected outputs compared against a second set of postconditions.

18. The computer-usable medium of claim 17, wherein the embodied computer program code further comprises computer executable instructions configured for:
  executing said second test procedure; and
  using said recording agent to capture data corresponding to said second set of known inputs, preconditions, outputs and post conditions;
  using said captured data from said second test procedure to generate said adaptive processes.

19. The computer-useable medium of claim 13, wherein the computer executable instructions are deployable to a client computer from a server at a remote location.

20. The computer-useable medium of claim 13, wherein the computer executable instructions are provided by a service provider to a customer on an on-demand basis.

* * * * *